United States Patent [19]

Lonseth et al.

[11] 4,112,041

[45] Sep. 5, 1978

[54] METHOD FOR REDUCING CORONA IN DYNAMOELECTRIC MACHINES

[75] Inventors: Palmer Lonseth; Hubert Gerald Panter; Donald G. Moorby, all of Peterborough, Canada

[73] Assignee: Canadian General Electric Company, Toronto, Canada

[21] Appl. No.: 791,663

[22] Filed: Apr. 28, 1977

Related U.S. Application Data

[62] Division of Ser. No. 656,865, Feb. 10, 1976, Pat. No. 4,068,691.

[30] Foreign Application Priority Data

Feb. 17, 1975 [CA] Canada .................................. 220400

[51] Int. Cl.² ........................ B29D 3/00; H02K 15/02
[52] U.S. Cl. ...................................... 264/263; 29/596; 264/130; 264/262; 264/264; 264/272
[58] Field of Search ............... 264/272, 263, 261, 264, 264/262, 130; 29/596; 310/43, 196

[56] References Cited

U.S. PATENT DOCUMENTS

| | | | |
|---|---|---|---|
| 3,194,993 | 7/1965 | Hackney et al. | 264/272 |
| 3,233,311 | 2/1966 | Giegerich et al. | 264/272 |
| 3,377,602 | 4/1968 | Kruse | 264/272 |
| 3,710,437 | 1/1973 | Kipple et al. | 264/272 |
| 3,824,683 | 7/1974 | Rhudy | 29/596 |
| 3,991,152 | 11/1976 | Santi et al. | 264/272 |

*Primary Examiner*—James B. Lowe
*Attorney, Agent, or Firm*—John F. Ahern; James W. Mitchell

[57] ABSTRACT

According to the invention, electrically conductive paths are formed between the coil armor and the core laminations of dynamoelectric machines for inhibiting corona. This is achieved by injecting an uncured, semiconducting, elastomeric material between the coil sides and the walls of the core slots by way of the air ducts in the core, and thereafter curing the material. The uncured material has a viscosity which enables it to be forced under pressure between the coil sides and slot walls by means of a pneumatically actuated gun assembly whose construction and operation are described in detail. The cured material has a resistance high enough not to form eddy current paths between laminations and yet low enough to conduct charge from the coil armor to the core. It is also capable of retaining its strength, elasticity, conductivity, etc., and remaining in place between the coils and core under vibrations, coolant flow, electric stresses, repeated temperature changes, etc., for the normal operating life of the machine.

3 Claims, 4 Drawing Figures

METHOD FOR REDUCING CORONA IN DYNAMOELECTRIC MACHINES

This is a Division of application Ser. No. 656,865, filed Feb. 10, 1976, now U.S. Pat. No. 4,068,691, issued Jan. 17, 1978.

BACKGROUND OF THE INVENTION

This invention relates to a method for providing conductive paths from the outer surface of conductor insulating jackets to the magnetic cores in dynamoelectric machines for purpose of inhibiting corona in the machine.

In a laminated magnetic core for a dynamoelectric machine the dimensions of the teeth vary somewhat between laminations, and the positions of the laminations vary in the core stacks. These irregularities are great enough that the surfaces of the slots have somewhat jagged faces. The coils used in the machine are insulated with outer jackets consisting of wrappings of porous materials impregnated with certain thermosetting resins and shaped in a mold while the resin is cured to a solid and hard state. This leaves the outer surfaces of the coils very smooth, hard and with some irregularities in their flatness. When these coils are in place in the slots, the smooth outer surfaces of the coils make physical contact with some of the high laminations, leaving voids between the jacket and other laminations.

Variations in coil side dimensions can lead to looseness of sides in their slots, resulting in voids or exaggerating the voids mentioned above. The tolerance of a coil side may be in a range of several mills. It is known to insert packing strips between a coil side and a slot wall to tighten-up the fit and thereby prevent movement of the side in the slot. These strips may be thin, non-metallic, electrically conductive springs which secure the side in the slot and provide electrical paths of controlled resistance between the coil armor and the slot wall. However, since the strips come in discrete thicknesses that can be driven between a coil side and a slot wall, this packing may not always make a side a tight fit in its slot; any looseness may lead to coil movement resulting in corona problems.

Electrical grade resinous materials should be good insulators of electricity and reasonably good conductors of heat. Certain epoxy resins meet this specification. However, those that do meet the specification cure to a hard state, and once fully cured, they do not soften appreciably when reheated during operation of the machine. These materials produce the so-called hard-bar windings in which the resin impregnants do not soften when the coils become hot and flow into the voids as did the asphaltic impregnants that preceded them. Because the resinous materials do not soften with heat and flow into the voids, the voids remain.

Initially, the armor covering on the coils usually make good electrical contact with many of the laminations defining the slot walls. These contacts placed the armor and core at essentially the same potential. However, vibration from machine operation will often break these contacts and cause sufficient coil movement to lead to a difference of potential between the armor and core. This potential difference imposes electrical stresses on the air in the voids formed at the breaks, stresses that may well be great enough to cause partial discharge from the coil surfaces to the core, i.e., a phenomenon often referred to as corona or corona discharge. The improved resinous materials make higher operating voltages possible, and this in turn subjects the void regions to high electrical stresses, or these newer insulations may even increase stresses without an increase in voltage. It is well known that in the presence of corona discharge insulating materials are eroded and may eventually break down.

Our Canadian Pat. No. 1,016,586, issued Aug. 30, 1977 and entitled "Grounding of Outer Winding Insulation to Cores in Dynamoelectric Machines," describes and claims a means for inhibiting corona in dynamoelectric machines such as large power generators. In this application, an elastomeric material of controlled electrical resistance is applied to the coil sides and then cured before the sides are inserted into the slots in the core. The lay of this material on a coil side is such that the material deforms as the side is inserted into a slot, causing the material to make contact with the laminations. In this particular approach to the corona problem, the elastomeric material is applied to the coil sides before they are inserted in the slots; the material cannot be applied to the coil sides already in place in the slots.

U.S. Pat. No. 3,824,683 issued July 23, 1974, Rhudy, discloses a method for reducing corona in machines having the coils in place in the slots of the core, for example, treating a machine that has been in service. In this particular method, a free flowing, electrically conductive paint is made to flow in between the coil sides and the slot walls so as to coat both. After the paint is dry, an elastomeric material is deposited in some of the air ducts in the core in contact with the coil surfaces and core. This material contains an electrically conductive filler whereby conductive paths are provided between coils and core.

The object of this invention is to improve the inhibition of corona in dynamoelectric machines having the coils in place in the slots of the magnetic core.

According to the invention conductive paths are formed between the winding and the core of a dynamoelectric machine by injecting a viscous, semi-conducting, elastomeric material between the coil sides and the slot walls by way of the air ducts in the core, and thereafter curing the material. The cured material is a tough rubber-like substance of an electrical resistance high enough not to short circuit the laminations of the core and yet low enough to conduct electric charge from the coil armor to the core; it is a substance that is capable of retaining its strength, elasticity, conductivity, etc., and remaining in place between the coils and core under vibration, coolant flow, electric stresses, repeated temperature changes, etc., for the normal operating life of the machine. These paths conduct electric charge from the coils to the core, and thereby inhibit the formation of corona.

Certain silicone resins are well suited for use as conductive path forming materials between the coils and core. Inherently, silicone resins are good electrical insulators, but some are relatively good conductors of heat as well. The good heat conductors are preferred because they will transfer heat from the coils to the core. To make them electrically conductive for purposes of conducting electric charge, they are filled with conductive fine particle materials such as carbon powder, lamp black or a mixture thereof. The amount of conductive powder added to the resin is just enough to give the cured product the necessary electrical properties, but not enough to detract significantly from its physical properties.

Apparatus for injecting an uncured elastomeric material into the space between a coil side and a wall of the slot containing the side consist of an injector tool adapted for insertion into a selected air duct in the core into communication with the coil side for material flow from the tool into the space between the side and slot wall; means for securing the tool in the duct while material flow takes place; and means for forcing material flow from the tool into the space. In a preferred apparatus, the securing means and the flow forcing means may be pneumatic actuating means.

BRIEF DESCRIPTION OF THE DRAWINGS

A preferred embodiment of the invention will now be described in more detail with reference to the accompanying drawings in which.

DETAILED DESCRIPTION OF THE INVENTION

For purposes of the foregoing discussion and the description to follow, a winding for a dynamoelectric machine is to be regarded as a large number of coils interconnected in a suitable circuit configuration. Each coil may have one or more turns of either a single conductor or a number of parallel strands. When references are made to coil sides, these are the portions of a coil that are located in the slots of the core.

Figures 1, 2:
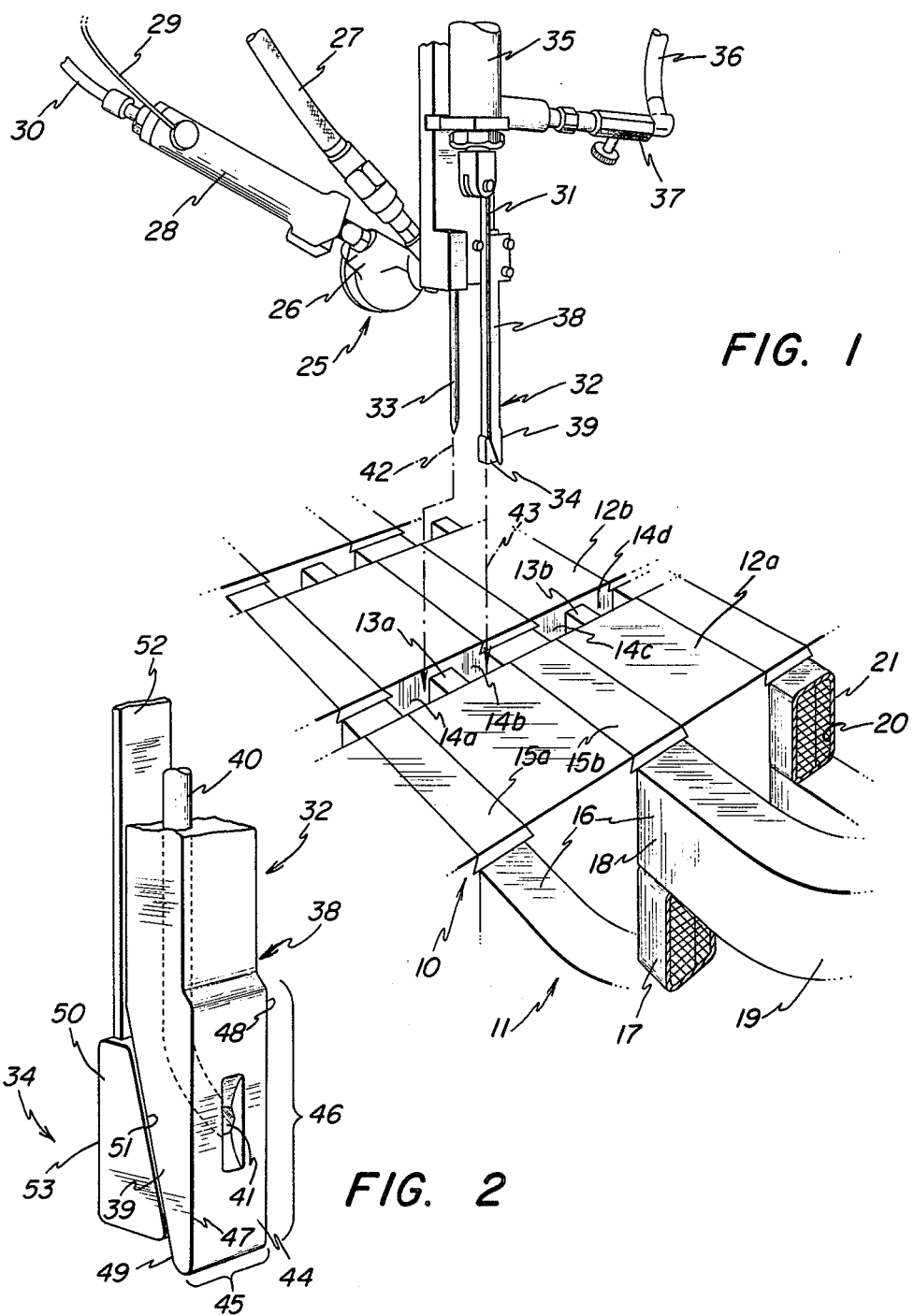
FIG. 1 is an exploded perspective view of a small portion of the stator of a large dynamoelectric machine and a gun assembly for injecting an uncured elastomeric material into the spaces between the coil sides and the slot walls.
FIG. 2 is a view in perspective of the injector tool.

FIG. 1 shows a portion of a stator for a dynamoelectric machine such as a large generator and apparatus for injecting an uncured elastomeric material into the spaces between the coil sides and the slot walls. The stator consists of a laminated magnetic core 10, a winding 11 and the usual supporting structure, none of which is shown. The core is made up of a plurality of stacks 12a, 12b, etc., of laminations, the stacks being spaced apart axially by means of the radially disposed spacers 13a, 13b, etc., so as to define radial air ducts 14a, 14b, etc. The core contains a plurality of axially directed slots 15a, 15b, etc., and the winding consists of a plurality of coils 16 having sides 17 and 18 located in two different slots and end turns 19 projecting from the ends of the core. Each coil has one side 17 located in the bottom of one slot and the other side 18 in the top of another slot at approximately one pole pitch coil span. This is a conventional core having a plurality of equally spaced slots containing a conventional distributed winding, a winding frequently found on the primary side of AC motors or on the armature of AC generators. The invention to be described later is in no way limited to this or any other particular core and coil arrangement.

Each coil 16 is shown as consisting of a plurality of conductor strands insulated from one another and encased in a jacket consisting of an inner insulating jacket 20 and an outer armor jacket 21. The strand insulation may be a covering of bonded glass filaments. After the strands have been formed into a coil of the desired number of turns and shape, the insulating and armor jackets are applied. Typically, the inner jacket is a number of layers of insulating materials such as resin bonded micaceous tapes, and the armor is one or more layers of a semi-conducting tape or paint, i.e., a material having a controlled resistance. The tapes may be several mils in thickness, and they may be applied in a number of layers, depending on the voltage that they must withstand. The layers are applied tightly and as uniformly smooth as possible, after which the resins in the tapes are cured by heat and pressure to achieve the necessary insulating properties. Even with the most careful application of the tapes and curing of the resins with the coil sides in pressure molds there will be some variations in width of the coil sides and flatness of their radial surfaces, i.e., these surfaces are frequently slightly concave. Hence, even with packing, there may well be some looseness of coil sides in their slots. When fully cured the resin bonded materials become very hard and rigid and do not soften appreciably when reheated. As a result, the radial surfaces of the coils present somewhat irregular and unyielding interfaces with the irregular surfaces of the punchings forming the slot walls. The hard coils do not soften when reheated from machine operation and deform sufficiently to fill the slots as did the asphaltic compounds of the prior art. Initially, the semi-conducting armor may have made good electrical contact with the core laminations so that the armor and slot walls were held at essentially the same potential. However, vibration from operation of the machine will often break these contacts and cause some coil movement. This may well enlarge the voids already present or even create new ones and thereby stress the air in the voids to corona levels, i.e., stresses at which partial discharge from the coil armor to the core takes place.

Apparatus for injecting an uncured elastomeric material into the spaces between the coil sides and the slot walls is the hand held gun assembly illustrated at 25 in FIG. 1 combined with a dispenser which is not shown. The dispenser is an air operated hydraulic pump which forces the uncured elastomeric material from a pail into a high pressure ram pump; the ram pump then forces the material at several hundred pounds pressure through the flexible hose 27 to the non-drip metering valve 26 of gun assembly 25. Valve 26 is mounted on a hand grip 28 which also houses the valve operating mechanism. This mechanism is operatively connected to the dispenser electrically and pneumatically by way of conductors 29 and flexible hose 30 for purposes of co-ordinating the operation of the combination. The injection apparatus described so far is known and available commercially, for example, it is used in building construction for sealing windows and masonry joints with thick paste-like compounds.

In addition to the known assembly of components 26 to 30, gun assembly 25 includes a number of other components now to be described. These other components consist essentially of a body portion 31, an injector tool 32 and a guide member 33 projecting from the body, tool securing means 34, a pneumatic actuator 35 supported on the body and operatively connected to the tool securing means, an air line 36 for connecting the actuator to a source of compressed air, and a control valve 37 in the air line for controlling operation of the actuator. Metering valve 26 is also attached to body 31; hence, components 26 to 37 comprise a single assembly. Reference should now be made to FIG. 2 as well as FIG. 1. Tool 32 is in the form of a stem 38 which terminates in a head 39. The stem and head contain a fluid flow passage 49 extending from metering valve 26 to an orifice 41 in the head. Hence the uncured elastomeric material released by the metering valve flows through this passage and is ejected from the orifice. Tool 32 and guide 33 project from body 31 in the same direction in substantially parallel relation, and their spacing is such that they can be inserted in a pair of air ducts 14 astride a spacer 13 in the way indicated in FIG. 1 by the phantom lines 42 and 43 for ducts 14a and 14b.

Figure 3:
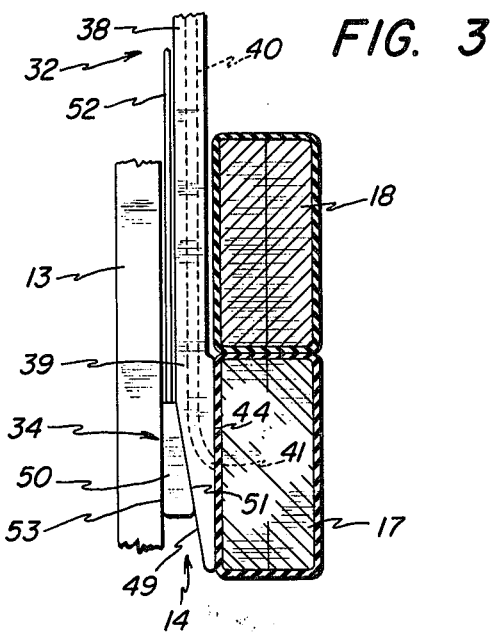
FIG. 3 is a view of the injector tool in place in an air duct for injecting the material between a coil and a slot wall.

FIG. 2 illustrates tool 32 and its securing means 34 in perspective and FIG. 3 shows them in place in an air duct 14. One side of head 39 is formed with a flat face 44 of rectangular outline of width 45 and length 46 and having orifice 41 in the middle of the face. The flat surface of this face is designed to fit against the radial surfaces of the coil sides where they pass through the spaces between the stacks 12 of laminations. The width 45 of face 44 is as great as the interstack space will accept and yet allow the head to be readily inserted and withdrawn from the duct, and its length 46 is approximately equal to the radial dimension of a coil side. When the tool is in place in an air duct as illustrated in FIG. 3, it has face 44 pressed against a radial coil surface, it has the long edges 47 and 48 of the face in very close proximity with the lamination stacks, and it is secured in this position by securing means 34.

The securing means illustrated consists essentially of an oblique surface 49 on head 39 on the side thereof directly opposite face 44, a wedging member 50 having a complementary surface 51 bearing on surface 49, and a strut 52 connecting the wedging member to the operator of pneumatic actuator 35 so that the actuator can cause the wedging member to slide along these surfaces for purposes of securing or releasing the tool. Surface 49 lies in a plane that diverges from the plane of face 44 as it progresses along the head from the tip thereof. The complementary surface 51 on the wedging member slopes in the opposite direction. Hence, movement of the wedging member relative to the head is both longitudinal and transverse. Movement up the inclined surface 49 drives the back surface 53 of the wedging member against a spacer 13, securing the head of the tool in a duct with its face 44 pressed against a radial surface of a coil side. The tool is now in place ready for injecting the uncured elastomeric material between a coil side and slot walls. Movement of the wedging member down the inclined surface 40 releases the tool so it can be withdrawn from the duct and inserted into another duct. In FIGS. 2 and 3, tool 32 is shown with face 44 set out a little from the side of the stem. This is not necessary; the face on the head and the side of the stem may lie in the same plane, and the width of this plane surface may be uniform throughout the length of the tool. It is, of course, obvious that the tool must be small enough throughout its length to allow it to be inserted into the ducts, and long enough to reach the sides in the bottoms of the slots.

Figure 4:
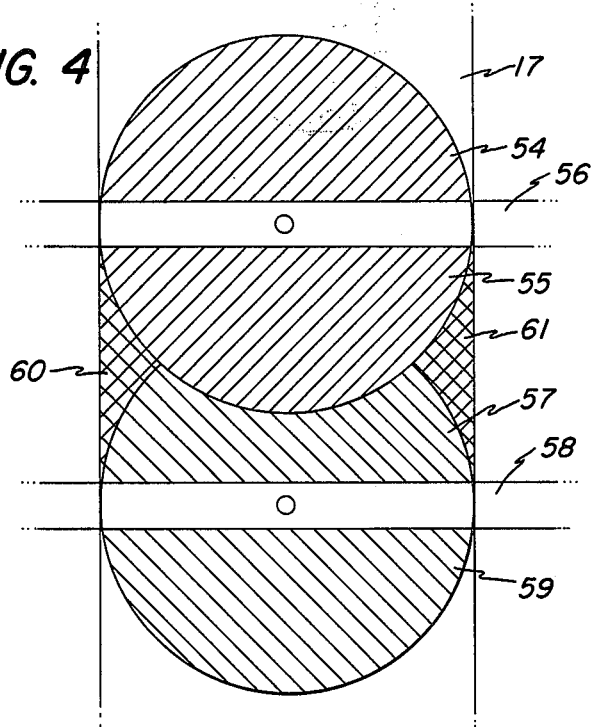
FIG. 4 is a view of the material flow pattern.

The method of injecting the uncured elastomeric material between coil sides and slot walls will now be considered. Holding gun assembly 25 in the hands, insert tool 32 and guide 33 into a pair of air ducts 14 astride a spacer 13 with face 44 next to the coil sides to be treated. The stem of the tool may be marked to indicate the depth that the tool is to be inserted for either a lower or an uppper coil side. Preferably, begin with the lower side and then withdraw the tool to treat the upper side. The tool is properly placed when its face 44 covers the radial surface of the coil side as shown in FIG. 3. With the tool in place, apply compressed air to actuator 35 by operating valve 37, causing the actuator to draw wedging member 50 up the inclined surface 49. During its travel, the wedging member abuts spacer 13 and thereby forces lateral movement of the tool head until its face is pressed firmly against the radial surface of the coil side. The tool is now in place ready for injecting the uncured elastomeric material between the coil side and slot wall. Material injection is effected by actuating valve 26 to release the pasty material. Since the material released is under relatively high pressure, it is forced out of orifice 41 along face 44 and in between the surface of the coil and the slot walls of the lamination stacks on both sides of the tool. The quantity of material released by valve 26 on each actuation can be set, and once set the valve releases the same quantity each time. The quantity needed is determined experimentally to give a distribution somewhat as illustrated in FIG. 4 where the cross-hatched areas 54 and 55 depict the flow pattern on either side of the interstack space 56. Finally, the tool is released from its lower coil position, repositioned and secured in the upper coil position, and the material injected as before. This procedure is repeated for the various ducts until a layer of the material has been injected between the slot walls and at least one radial surface of all the coil sides. The material is now allowed to cure under room conditions by simply leaving it undisturbed for a period of time. One layer is usually enough because any looseness of a coil side in its slot is taken up by the pasty material forcing the side over firmly against the other side of the slot as the material is squeezed between the side and slot wall.

FIG. 4 illustrates the distribution of the material on a radial coil surface between adjacent interstack spaces 56 and 58. As already pointed out, the material flows in opposite directions from the tool, covering areas 54 and 55 from space 56. It does the same in the adjacent interstack space 58 where areas 57 and 59 are covered. It is to be noted that patterns 55 and 57 unite to cover most of the coil surface between 56 and 58; only two small areas 60 and 61 remain where coverage may not be as complete as in areas 55 and 57.

The uncured material referred to above is a type which cures rapidly when exposed to air, becoming a tough rubbery substance which holds the coil sides firmly in their slots and provides corona discharge paths from the coil armor to the core. As is to be expected, some of this material is also extruded into the air ducts, where it can block machine ventilation if not removed. The material lodged in the ducts can be removed by allowing it a short time to stabilize to a consistency where it is easily scraped or wiped off. However, this time must be watched carefully; otherwise the material may cure to a rubbery state where it is very difficult to remove.

The material forced between coil sides and slot walls is an electrical conductor in the sense that it allows electric charge to flow from the coil armor to the core, and in so doing it inhibits the destructive effects of corona. Materials found suitable for this purpose are certain room temperature vulcanizing (RTV) silicone resins. This type of resin is normally a heat conductor and an electrical insulator. Hence, to render it electrically conductive it is filled with fine particles of graphite and/or lamp black dispersed in the material. Examples of suitable silicone resins are those sold by the General Electric Company, Waterford, N.Y. as RTV-108 and CRTV-5120, the former being an unfilled thermally conductive silicone resin and the latter a filled electrically and thermally conductive silicone resin. The amount of filler added is just enough to give the material an electrical resistance within a range of approximately 1000 to 80,000 ohms per square, and preferably about 4000 ohms per square. A resistance controlled within this range renders the cured material sufficiently conductive for readily passing charge on the coil armor to the core and sufficiently non-conductive that it does not form eddy current paths between the core laminations. The resistance of the cured material is of the same order of magnitude as the resistance of the coil armor. Materials answering this description are known in the art as "semi-conducting" materials. The amount of filler added is low enough that the physical and chemical properties of the polymer are not changed to a significant extent, and moreover, these properties along with the electrical resistance are maintained over the life of the machine. An example of a suitable silicone rubber composition is one comprising from about 20 percent to 50 percent by weight of electrically conductive carbon powder and from about 80 percent to 50 percent by weight of silicone rubber polymer. This particular composition cures rapidly at room temperature when exposed to the ambient, and remains stable during normal operation of the machine.

Silicone resins such as those mentioned above cure to become very tough and durable polymers which also bond fast to clean surfaces that they come into contact with. Hence, the cured material not only fills spaces between coil sides and slot walls, but it may also bond them firmly in their slots. This is very good so long as there is no need to remove any of the sides. However, in many instances it may well be necessary to replace defective coils. If the coils are to be removable, as they usually must be, a release agent should be applied to the coil and/or slot surfaces before the silicone resin contacts them. A release agent is a substance which prevents the polymer from adhering to these surfaces. In the case of a machine in the process of manufacture, a thin film of a release agent can be applied to the slot walls before the coil sides are inserted in the slots; usually, the release agent will be a liquid. Once the coils are in place in their slots, i.e., a wound machine, the release agent must be in liquid form to enable coating the contiguous surfaces where the film is needed. Predetermined amounts of this liquid can be squirted into regions from where it will flow in between the surfaces to be kept free from polymer adhesion. Wetting of these surfaces with the release agent is followed by injection of the elastomeric material. If a machine has been in service for some time, the surfaces may first need cleaning with a liquid solvent applied in the same way as the release agent.

A material found to be suitable as a release agent is a Dupont liquid containing a dispersion of polytetrafluoroethylene (PTFE) and known in the trade as Vydax AR. This material is diluted one part by volume liquid to four parts by volume trichloroethane to obtain a mix containing 4% solids PTFE. When the coil and core surfaces have been wetted with this mixture before injection of the resin, the cured product does not adhere to them and acceptable resistivity readings are obtained.

While our invention has been described herein with respect to certain preferred embodiments and specific examples, numerous modifications and changes will readily occur to those skilled in the art. We intend, therefore, to cover all such modifications and changes as fall within the scope of this disclosure.

What is claimed is:

1. The method of inhibiting corona in a dynamoelectric machine including a core having a plurality of stacks of magnetic laminations spaced apart axially to define interstack spaces; axially directed slots in said core; spacers disposed radially in said interstack spaces; and coil sides disposed in said slots; said method comprising:
   (a) positioning an injector tool in an interstack space and adjacent to a radial surface of a coil side, said injector tool including a flat face of width slightly less than the width of said interstack space and said face having an orifice in the middle thereof for accommodating flow of an uncured, semiconducting, elastomeric material from a source connected to said injector tool;
   (b) securing the tool in said interstack space with the flat face pressed against said radial surface of said coil side;
   (c) releasing said uncured material from said source for flow through said orifice, along said face, and between the radial surface of said coil side and the slot walls adjacent to said tool;
   (d) releasing said tool;
   (e) repeating steps (a), (b), (c), and (d) for other coil sides in this and other interstack spaces; and
   (f) curing said material to form a tough, rubbery compound having an electrical resistance low enough to conduct electric charge and yet high enough to not cause significant eddy-current flow between core laminations.

2. The method of claim 1 including the further step of applying a release agent to the coil side and/or slot walls before material injection to stop the material from adhering to them.

3. The method of claim 1 wherein said flat face of said injector tool has a length approximately equal to the radial dimension of said coil side.

* * * * *